(12) United States Patent
Toia et al.

(10) Patent No.: US 6,303,538 B1
(45) Date of Patent: Oct. 16, 2001

(54) PROCESS FOR PRODUCING METALLIC FIBER BOARDS FUNCTIONALIZED BY CATALYSTS AND BOARDS SO PRODUCED

(75) Inventors: Luca Toia, Busto Arsizion; Claudio Boffito, Rho; Vittorio Ragaini, Milan; Stefania Vitali, Milan; Claudia L. Bianchi, Milan, all of (IT)

(73) Assignee: Saes Getters S.p.A., Milan (IT)

( * ) Notice: Subject to any disclaimer, the term of this patent is extended or adjusted under 35 U.S.C. 154(b) by 0 days.

(21) Appl. No.: 09/324,357

(22) Filed: Jun. 2, 1999

(30) Foreign Application Priority Data

Jun. 3, 1998 (IT) .............................................. MI98A1245

(51) Int. Cl.[7] .............................. B01J 35/10; B01J 33/00; B01J 32/00; B01J 35/02; B01J 35/04
(52) U.S. Cl. ..................... 502/439; 502/2; 502/527.12; 502/527.13; 502/527.14; 502/527.15; 502/527.16; 502/527.19; 502/527.24; 502/305; 502/319; 502/320; 502/325; 502/326; 502/327; 502/332; 502/333; 502/336; 502/338; 502/339; 502/355
(58) Field of Search .......................... 502/2, 439, 527.12, 502/527.13, 527.14, 527.15, 527.16, 527.19, 527.24, 305, 319, 320, 325, 326, 327, 332, 333, 336, 338, 339, 355

(56) References Cited

U.S. PATENT DOCUMENTS

| | | | |
|---|---|---|---|
| 3,920,583 | * 11/1975 | Pugh | 502/314 |
| 4,196,099 | * 4/1980 | Hunter et al. | 502/167 |
| 4,601,999 | * 7/1986 | Retallick et al. | 502/314 |
| 4,891,350 | * 1/1990 | Chopin et al. | 502/439 |
| 5,232,882 | * 8/1993 | Yoshimoto et al. | 502/5 |
| 5,401,483 | * 3/1995 | Ostroff | 423/376 |
| 5,721,188 | * 2/1998 | Sung et al. | 502/439 |
| 6,099,809 | * 8/2000 | Foster et al. | 422/180 |

FOREIGN PATENT DOCUMENTS

| | | |
|---|---|---|
| 0415835 | 3/1991 | (EP) . |
| 0640382 | 3/1995 | (EP) . |
| 1467917 | 2/1967 | (FR) . |
| 2347976 | 11/1977 | (FR) . |
| 2460388 | 1/1981 | (FR) . |
| WO 83/01017 | 3/1983 | (WO) . |

* cited by examiner

Primary Examiner—Elizabeth D. Wood
(74) Attorney, Agent, or Firm—Oppenheimer Wolff & Donnelly LLP

(57) ABSTRACT

The present invention discloses metallic fiber boards having catalytic functionality and processes for producing the same. The boards are formed from a mesh of metallic fibers, each fiber having a first layer of an oxide and a second layer of a porous oxide. A catalyst, either disposed on the surface of the second layer, or dispersed within the second layer, provides catalytic functionality to the fiber board. The first layer is produced by thermal oxidation of the metallic fibers, while the second layer and catalyst are produced by thermal decomposition of precursor materials applied to the fiber board while in solution, typically as a spray of atomized droplets. The resulting boards are used to catalyze the combustion of hydrocarbons, especially methane, and particularly in household boilers.

33 Claims, 6 Drawing Sheets

PROCESS FOR PRODUCING METALLIC FIBER BOARDS FUNCTIONALIZED BY CATALYSTS AND BOARDS SO PRODUCED

FOREIGN PRIORITY

This application claims foreign priority under 35 U.S.C. §119(b) from Italian Patent Application No. MI98A 001245, filed Jun. 3, 1998, incorporated herein by reference.

BACKGROUND OF THE INVENTION

The present invention relates to a metallic fiber board having catalytic functionality and to a process for making the same. Particularly, the invention relates to a process for the production of a catalyst-bearing metallic fiber board for catalyzing the combustion of hydrocarbons and suitable to be used in different hydrocarbon burning devices such as household boilers.

Household boilers produce heat through the combustion of hydrocarbon gases, though only methane has commonly been used in recent years. In traditional boilers, in order to achieve complete combustion of methane to prevent the products of incomplete combustion, such as CO, from being released into the atmosphere, temperatures of at least about 800° C. are required. Such high temperatures, however, allow undesirable nitrogen oxide compounds to form, generally referred to as $NO_x$, that cause serious pollution problems when emitted into the atmosphere. Various systems have been studied to lower the necessary temperature for complete combustion The lowest temperatures at which the complete combustion of methane has been obtained have required the use of catalysts, and these catalytic systems have successfully eliminated the formation of $NO_x$ compounds.

Generally, the catalysts in these systems are provided on a metallic or a ceramic substrate. Such substrates need to have very open structures in order to allow the air/methane mixture to pass easily. For instance, wire meshes, metallic or ceramic bodies provided with holes, and boards or meshes made of metallic or ceramic fibers have all been used. An article entitled "Performances of Premixed-Air Fibrous Burners with a Metallic and Ceramic Matrix" by Accornero et al., published in "$CH_4$ Energia Metano", 1995, No.2, pages 20–33, discloses, for example, systems for lowering the methane combustion temperature involving the use of a fiberous catalyst formed into a board. The fibers in this example are produced from a Fe—Cr—Al alloy coated with an aluminum oxide (alumina) layer on which a catalytic layer of lanthanum manganite, $LaMnO_3$, is depositted. The article, however, gives no account of how the $LaMnO_3$ layer is prepared.

The patent application WO 97/02092 discloses another catalytic system obtained from a perforated foil or a metallic grid on which a porous ceramic layer, preferably of alumina or zirconia, is deposited by means of techniques including plasma spraying, flame spraying, and detonation spraying. The ceramic layer is then impregnated with a catalyst precursor solution or suspension. After suitable thermal treatments the final catalytic system is obtained. The production process described by this application, however, is disadvantageous in that only the side of the metallic substrate facing the spraying nozzles can be coated with the ceramic layer. Consequently, coating two opposite sides of a substantially flat body, such as a perforated foil, requires two successive coating phases. Further, the method is unworkable when applied to fibrous boards because the sprayed ceramic tends to adhere to the first contacted surface, namely the most external fibers, and does not effectively coat the interior fibers.

What is desired, therefore, is a board comprised of metallic fibers having catalytic functionality, as well as a process for producing such a board.

SUMMARY OF THE INVENTION

The present invention provides a metallic fiber board having catalytic functionality and a process for making the same.

An embodiment of the present invention is a metallic fiber board comprising a plurality of metallic fibers, wherein the fibers are coated with a first layer, a second layer, and a catalyst. The first layer comprises a dense oxide covering the surfaces of the fibers. The second layer comprises a porous oxide covering the exterior surface of the first layer. The catalyst is a noble metal selected from the group of elements comprising the eighth group of the periodic table and is distributed across the exterior surface of the second layer. In another embodiment of the present invention the second layer is instead impregnated with the catalyst rather than coated with it.

The present invention is advantageous for several reasons. The fiber board itself provides a convenient and commercially available substrate that may readily be formed into shapes to fit within different boilers. The fiber board also provides a large surface area that may support a larger quantity of a catalyst then could be supported, for example, on a perforated sheet. The fiber board further provides a very open structure that allows gases to pass easily. The first layer of a dense oxide is advantageous for providing good refractory properties. In some embodiments the first layer and the second layer are formed of the same oxide, thereby providing better adherence between the two layers. The second layer, being porous, is advantageous for providing even greater surface area to the fiber board for supporting the catalyst.

An embodiment of the process for making a metallic fiber board with catalytic functionality includes providing a metallic fiber board, thermally treating the fiber board to oxidize the metallic fibers and thus produce a first layer of an oxide, forming a second layer of a porous oxide over the first layer, and forming a catalyst on the surface of the second layer. In this embodiment the second layer is formed by preparing a solution of a precursor compound in a solvent, directing an atomized spray of the solution at the fiber board, and thermally treating the fiber board to decompose the precursor to form the desired oxide. Additional embodiments are directed towards an iterative process whereby the spraying of the solution is performed as a succession of brief spray operations separated by pauses.

In some embodiments the catalyst is similarly formed by preparing a solution containing a catalyst precursor, spraying the atomized solution onto the fiber board, and thermally decomposing the precursor to form the desired catalyst. Further embodiments are directed to performing the spraying process in the same iterative manner described for forming the second layer. Still other embodiments involve forming the catalyst by preparing a solution containing a catalyst precursor, dipping the fiber board into the solution, withdrawing the fiber board, and thermally treating the board to decompose the precursor into the catalyst. Yet another embodiment is directed towards preparing a solution containing precursors for both the second layer oxide and the catalyst, spraying the atomized solution onto the fiber board, and thermally treating the board in order to decompose both precursors together to create a second layer impregnated with the catalyst.

These embodiments of the present invention provide advantages over prior art methods for producing fiber boards with catalytic functionality. Techniques of the prior art such as plasma spraying and flame pyrolisis tend only to coat the topmost fibers and only those surfaces that are directly exposed to the spray nozzles. The present invention allows for a much more complete coating of substantially more fibers, thus imparting significantly more catalytic functionality to the fiber board than would otherwise be possible. Further, these embodiments allow for the production of catalytic fiber boards with complex geometries, such as hemispherical caps. The embodiment in which the second layer is impregnated with the catalyst is further advantageous for reducing the total number of processing steps and the total processing time necessary to produce a catalytic fiber board.

Additional advantages of the present invention will become apparent to those skilled in the art upon a reading of the following detailed description of the preferred embodiments, the examples, and the figures.

DETAILED DESCRIPTION OF THE PREFERRED EMBODIMENTS

Figure 1:
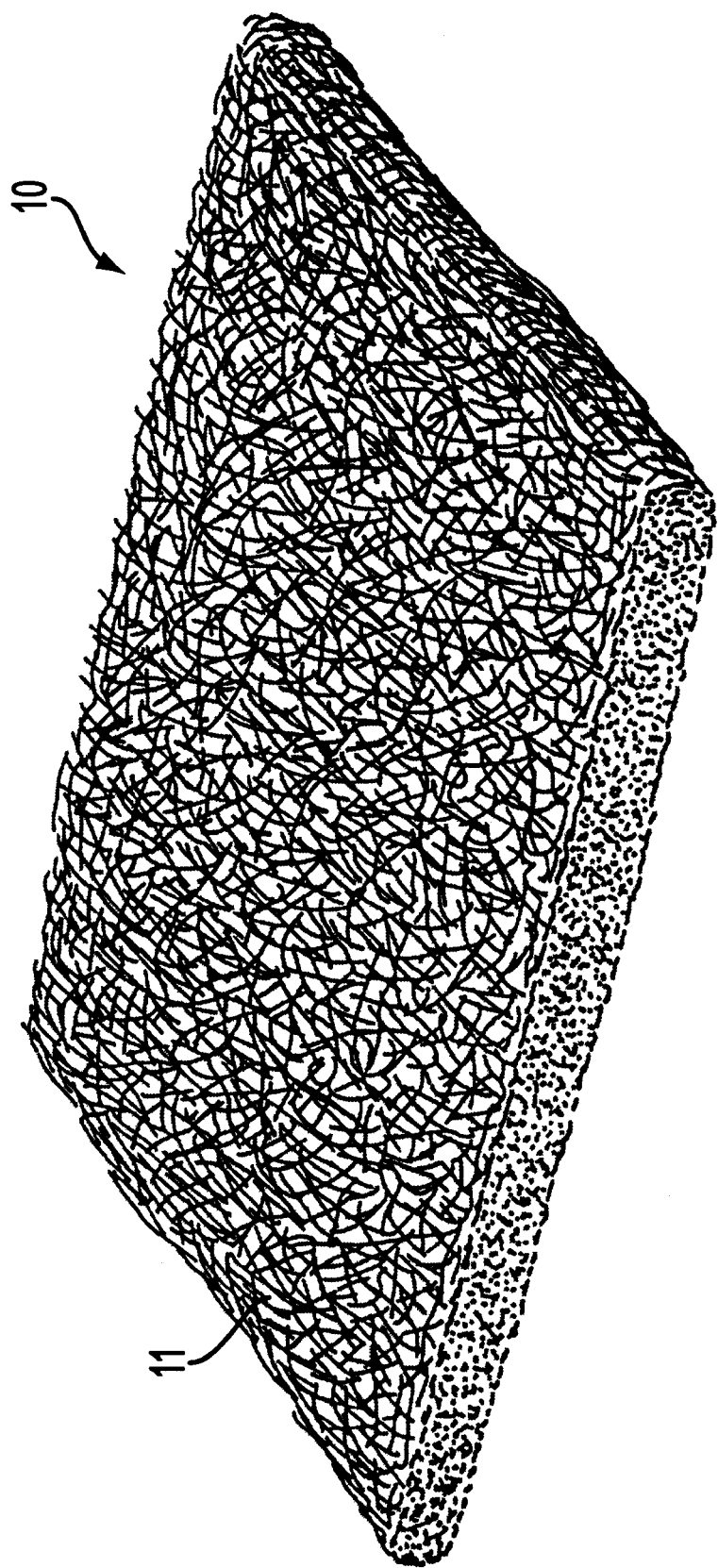
FIG. 1 is perspective view of a cross-section of a metallic fiber board according to the present invention.

FIG. 1 shows a fiber board 10 according to the present invention. The fiber board 10 comprises an intertwined mesh of fibers 11. Each of the fibers 11 comprises a metallic core surrounded by two oxide layers, a dense inner oxide layer and a porous outer oxide layer. In one embodiment of the present invention the exterior surface of the outer oxide layer is coated with a catalyst, while in another embodiment the outer oxide layer is impregnated with a catalyst. The fibers 11 of the present invention are said to be "functionalized" when they possess the catalytic functionality necessary to catalyze a chemical reaction.

Figure 2:
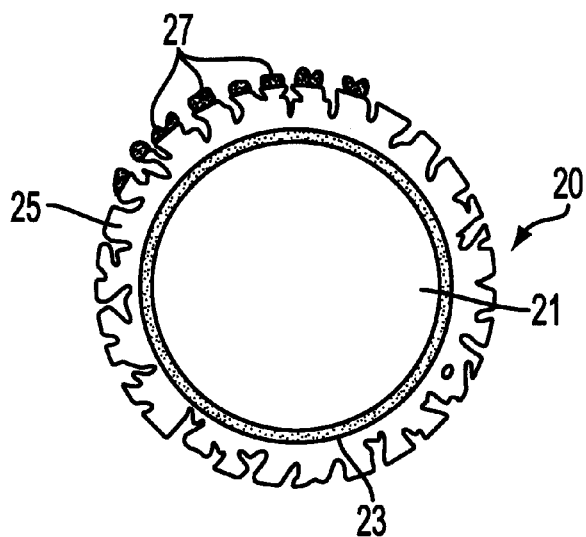
FIG. 2 is a cross-section of a catalyst functionalized fiber obtained according to an embodiment of the present invention.

FIG. 2 shows a cross-section of a functionalized fiber 20 having a surface with catalytic functionality according to an embodiment of the present invention (the various constituting parts are not drawn to scale). The functionalized fiber 20 is formed of a core fiber 21 having a first layer 23 grown thereon. A second layer 25, coating the exterior of the first layer 23, has particles of a catalyst 27 dispersed across its surface.

Figure 3:
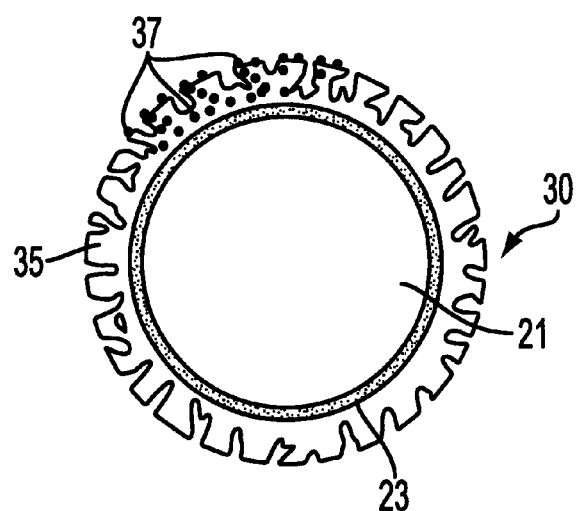
FIG. 3 is a cross-section of a catalyst functionalized fiber obtained according to another embodiment of the present invention.

FIG. 3 shows a cross-section of a functionalized fiber 30 having a surface with catalytic functionality according to an alternative embodiment of the present invention (the various constituting parts are not drawn to scale). The functionalized fiber 30 is formed of a core fiber 21 having a first layer 23 grown thereon. A second layer 35, coating the exterior of the first layer 23, is impregnated with particles of a catalyst 37.

Core fiber 21 may be made of steel or, preferably, of Fecralloy® (registered trademark of the company UKAEA, Didcot, Great Britain), an alloy principally containing iron, chromium, and aluminum. Fecralloy® shows refractory characteristics, and therefore is suitable for extended use at high temperatures, such as those encountered in boiler burners. Pre-made Fecralloy® fiber boards are available from N. V. Bekaert S A, Zwevegem, Belgium, under the trade-name Bekitherm®. Bekitherm® boards can be variously shaped and adapted to fit various kinds of burners. Most commonly, boiler burners employ either flat boards with rectangular geometries, or boards shaped as hemispherical caps.

The first layer 23 is an oxide covering the surface of core fiber 21. The first layer 23 preferably is nearly fully dense with a thickness in the range from about 5 nanometers to about 25 nanometers. In one embodiment of the present invention, shown in FIG. 2, the second layer 25 coats the exterior surface of first layer 23. The second layer 25 is a porous oxide with a large specific surface area, making it an excellent substrate for catalytic purposes. A catalyst 27 resides on the surface of the second layer 25. In another embodiment of the present invention, shown in FIG. 3, the second layer 35, also a porous oxide with a large specific surface area, is impregnated with a catalyst 37.

Various oxides are suitable for second layers 25 and 35 including, for example, alumina ($Al_2O_3$), silica ($SiO_2$), and combinations thereof. In those embodiments in which the first layer 23 is substantially composed of alumina, second layer 25 and 35 are preferably also formed of alumina in order to favor good adhesion between the two layers. Second layers 25 and 35 should have thicknesses in the range of about 80 nanometers to about 200 nanometers.

Catalysts 27 and 37 are selected to have catalytic functionalities specific to the desired applications. When the desired application is catalyzing methane combustion, the catalysts 27 and 37 preferably are noble metals selected from the eighth group of the periodic table, with rhodium (Rh) and palladium (Pd) working well. In some embodiments the catalysts 27 and 37 are formed as metals, and in other embodiments they are formed as the oxides of the metals.

Figure 4:
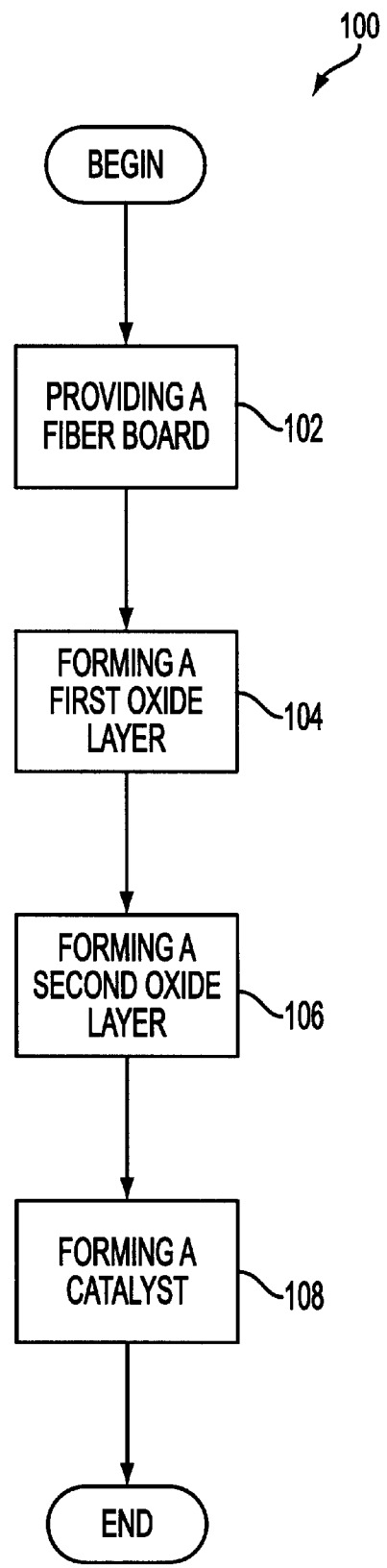
FIG. 4 is a process diagram describing the formation of a fiber board having catalytic functionality according to an embodiment of the present invention.

FIG. 4 is a process diagram illustrating the acts or operations of a method 100 of making a fiber board 10 with catalytic functionality according to the present invention. The method 100 includes providing an initial fiber board substrate in act or operation 102, forming a first oxide layer 23 in act or operation 104, forming a second oxide layer 25 in act or operation 106, and forming a catalyst 27 in act or operation 108.

Providing an initial fiber board substrate in act or operation 102 involves preparing an interwoven mesh of core fibers 21 with a predetermined shape suitable for further processing. The core fibers 21 may be composed of any metal that will form a reasonably dense and refractory oxide surface coating in an oxidizing atmosphere. In some embodiments of the present invention the core fibers 21 are made of Fecralloy®. Other embodiments of the present invention employ core fibers 21 made of steel. Some pre-made interwoven meshes of core fibers 21 are commercially available, for example, Fecralloy® fiber boards are available from N. V. Bekaert S A, Zwevegem, Belgium, under the trade-name Bekitherm®. Other interwoven meshes of core fibers 21 may be prepared according to fabrication methods well known in the art.

Act or operation 102 further includes forming the interwoven mesh of core fibers 21 to a predetermined shape. Such a predetermined shape should be one suitable for the final application envisioned for the completed fiber board 10. Some embodiments of the present invention are directed to a fiber board 10 for use in boiler burners, typically requiring the interwoven mesh of core fibers 21 to either be formed as a rectangular shape or a hemispherical shape. Methods for sizing and shaping fiber boards are well known in the art. Additionally, act or operation 102 includes preparing the initial fiber board substrate for further processing. This includes removing dirt and other surface contaminations so that the core fibers 21 are clean and dry. Techniques for cleaning fiber boards are also well established in the art.

Act or operation 104 involves forming the first layer 23, a dense oxide film on the surface of core fiber 21, by exposing the initial fiber board substrate to a thermal treatment in an oxidizing atmosphere. The thermal treatment can be performed, for example, in a furnace or in a muffle, under either a static or flowing atmosphere. In all cases, the atmosphere should be oxidizing and may, for example, be air, oxygen, air mixed with additional oxygen, mixtures of nitrogen and oxygen, water vapor, or combinations thereof.

The final thickness of first layer 23 obtained in act or operation 104 will depend on the treatment temperature and the time spent at that temperature. The parameters of processing time and temperature may be varied over wide ranges in order to obtain an appropriate thickness of the first layer 23, as these parameters are related to each other by an inverse proportionality relationship. For instance, a suitable thickness of the first layer 23 may be obtained with a treatment of about 10 minutes at a temperature of about 1200° C., or with a treatment of about 10 hours at a temperature of about 550° C. For some embodiments it has been found that treatments in air at temperatures between about 1000° C. and 1100° C. for periods, respectively, between about two hours and half an hour work well. Such treatments result in a first layer 23 that is generally very dense.

In some embodiments of the present invention, first layer 23 is produced by exposing a Fecralloy® fiber board to a high temperature treatment in an oxidizing environment. The first layer 23 formed on a core fiber 21 made of Febralloy® is mainly composed of alumina, which imparts good refractory characteristics. In other embodiments first layer 23 may be formed, for example, of chromium oxide, nickel oxide, molybdenum oxide, or mixtures thereof, depending on the composition of the initial fiber board substrate.

Forming the second layer 25 is accomplished in act or operation 106 which includes both depositing a precursor compound and decomposing the precursor compound with a thermal treatment. Depositing a precursor compound further includes preparing a solution and spraying atomized droplets of that solution onto a fiber board that has previously been processed according to act or operation 104.

Preparing a solution in act or operation 106 involves mixing a suitable precursor compound with a suitable solvent in an appropriate ratio. A suitable precursor compound is one that may be thermally decomposed to form a desired oxide as second layer 25, and that will readily go into solution with a suitable solvent. Easily soluble salts that are desirable as the precursor compound include, for example, nitrates, acetates, and organometallic species such as alkoxides, having the general formula $M(OX)_n$, where M represents the cation whose oxide has to be obtained, X is a hydrocarbon radical and n is the valence of the M cation. For embodiments starting with a Fecralloy® fiber board as the initial fiber board substrate, the precursor compound should be one that will decompose during a thermal treatment to form alumina, for example, aluminum nitrate, $Al(NO_3)_3$, and aluminum isopropylate $Al(-OCH(CH_3)_2)_3$.

Suitable solvents for creating the solution include water, low molecular weight alcohols, and hydroalcoholic mixtures. Several considerations go into the selection of a suitable solvent. The solvent should be one in which the chosen precursor compound is highly soluble, and one in which a fully saturated solution will not be too viscous or likely to foster the formation of colloidal suspensions. High solubility of the precursor compound is desirable so that each droplet reaching the fiber board carries a significant amount of precursor compound. Low viscosity when fully saturated and a resistance to the formation of colloidal suspensions are both desirable for good atomization of the solution. A solvent that works well with alumina precursor compounds is a mixture composed, by weight, of about two thirds water and about one third isopropylic alcohol.

Ideally, the solution should be fully saturated with the precursor compound in order to deposit the most precursor compound in the shortest period of time. High saturation levels, however, tend to foster the formation of undesirable colloidal suspensions. In order to enhance solution homogeneity, therefore, the solution pH may be adjusted to a value appropriate for preventing the formation of colloidal species. Techniques for adjusting the pH of a solution to avoid colloidal formation are well known in the art.

Once a solution of a suitable solvent and a suitable precursor compound has been prepared, depositing that precursor compound further includes spraying atomized droplets of that solution onto the fiber board that has previously been processed according to act or operation 104. Atomization of the solution is achieved by using spray nozzles and conditions well known in the art. Various carrier gases may be used in the atomization process, for example, air, argon, and nitrogen.

The fiber board, previously coated with the first oxide layer 23 in act or operation 104, is kept at a temperature from about 50° C. to about 150° C. during act or operation 106, with the range of about 80° C. to about 120° C. being preferable. At temperatures below about 50° C. solvent evaporation rates are too low, causing most of the solution to percolate as a liquid through the fiber board, carrying with it the precursor compound. Consequently, some of the precursor compound may not be deposited, and that which is deposited may lack uniformity, resulting in poor yields. On the other hand, at temperatures above about 150° C. solvent evaporation rates are too high, so that the solution does not have enough time to spread inside the fiber board, instead only coating the fibers nearest the surface and facing the spray nozzle.

In some embodiments of the present invention, act or operation 106 is performed by a plurality of atomization iterations separated by pauses, rather than by a continuous process. A continuous deposition can cause the substrate to cool excessively due to the evaporation of the solvent, causing the solution to percolate through the board fibers as described above. Using a solution that is fully saturated with the precursor compound is therefore additionally desirable for preventing deposits formed in previous iterations from being redissolved and removed in successive iterations. Best results have been obtained by successive atomization iterations of about two minutes each separated by pauses lasting between about 5 minutes to about 10 minutes, with an atomization flow rate of about 1 ml of solution for about 100 $cm^2$ of board geometric surface to be coated. Optimal thickness values of the second layer 25, ranging between about 80 to about 200 nanometers, have been obtained by using about 10 to about 100 atomization iterations.

Once a suitable amount of precursor compound has been deposited, forming the second layer 25 is completed in act or operation 106 with a thermal treatment to decompose the precursor compound. The thermal treatment is preferably performed in a muffle furnace in air at a temperature of about 500° C. for a period of time from about 1 to about 3 hours. Such a treatment completely removes any residual solvent left in the precursor compound deposit and decomposes the precursor compound to the corresponding oxide. In some embodiments of the present invention an additional pre-heat treatment specifically to remove residual solvent may be performed. Such a pre-heat treatment may span a few minutes at temperatures of about 200° C. to about 250° C.

Forming a catalyst on the surface of second layer 25 is accomplished in act or operation 108. Forming the catalyst involves preparing a solution, applying that solution to the fiber board previously coated with the second oxide layer 25 in act or operation 106, and subjecting the thusly coated fiber board to another thermal treatment. Preparing a solution, as in act or operation 106, involves selecting a catalyst precursor compound, a suitable solvent, and an appropriate concentration of the catalyst precursor in the solvent.

A suitable catalyst precursor is one that may be thermally decomposed to form a desired catalyst 27, and that will readily go into solution with a suitable solvent. Easily soluble salts that are desirable as the catalyst precursor include, for example, nitrates of the desired catalyst, for example, palladium nitrate, $Pd(NO_3)_2$. Salts whose cation is an amino-complex of the catalyst ion can be also used where the desired catalyst 27 is palladium or rhodium.

Suitable solvents for creating the solution in act or operation 108 include water, alcohols, and hydroalcoholic mixtures. Several considerations go into the selection of a suitable solvent. The solvent should be one in which the chosen catalyst precursor is highly soluble, and one in which a solution containing the desired concentration of the catalyst precursor will not be too viscous or tend to form colloidal suspensions. Colloidal suspensions may also be avoided by proper manipulation of the pH of the solution. A good concentration of the catalyst precursor in the solution is about 1% by weight of catalyst ion.

Once a solution of a suitable catalyst precursor in a suitable solvent has been prepared, having a proper concentration of the catalyst ion, depositing that precursor compound may be accomplished in different ways. In one embodiment of the present invention the fiber board previously coated with the second oxide layer 25 is dipped, for a period of about 10 to 100 minutes, into the solution maintained at a temperature in the range of about 25° C. to about 50° C., and then withdrawn. In another embodiment, the catalyst precursor is deposited by spraying atomized droplets of the solution onto the fiber board previously processed according to act or operation 106. Spraying atomized droplets is preferably performed in one to ten short iterations separated by pauses, while keeping the substrate at a temperature of about 50° C. As in act or operation 106, atomization of the solution in act or operation 108 is achieved by using spray nozzles and conditions well known in the art. Various carrier gases may be used in the atomization process such as air, argon, and nitrogen.

Following the deposition of the catalyst precursor, the fiber board is thermally treated to convert the catalyst precursor to the catalyst 27. The thermal treatment is performed in a muffle furnace at 500° C. for about 30 to about 120 minutes in a reducing environment or in air depending on whether the catalyst 27 sought to be obtained is desired as a metal or as an oxide.

Figure 5:
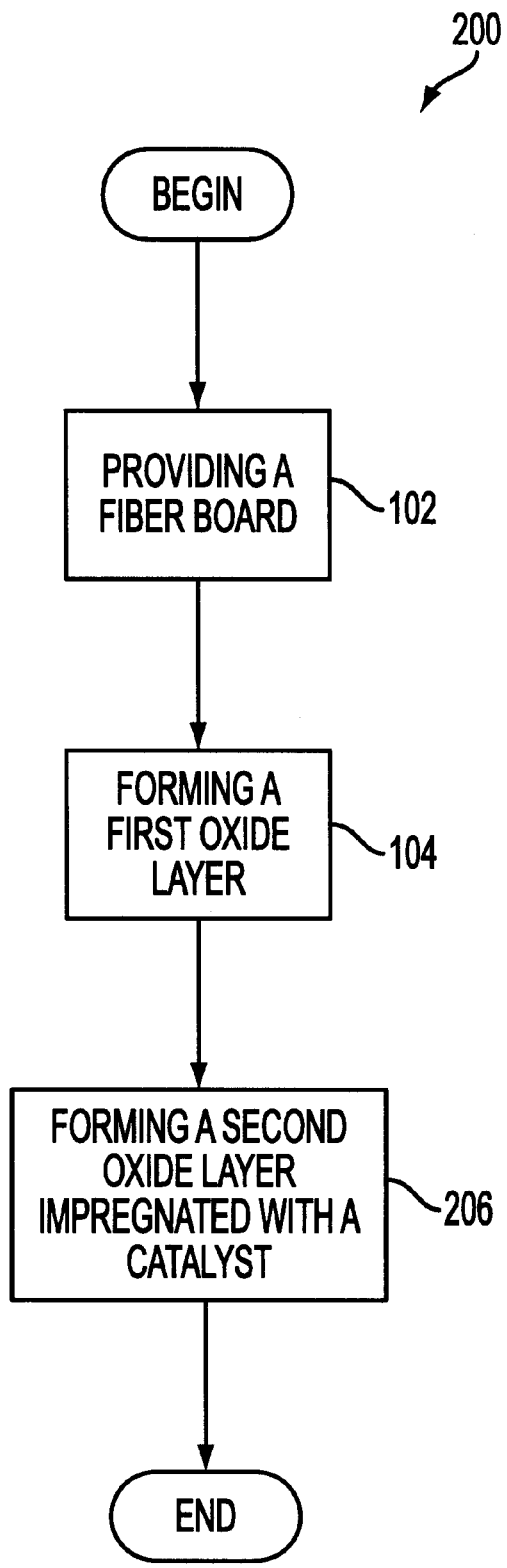
FIG. 5 is a process diagram describing the formation of a fiber board having catalytic functionality according to another embodiment of the present invention.

FIG. 5 is a process diagram illustrating the acts or operations of a method 200 for producing a fiber board 10 with catalytic functionality according to another embodiment of the present invention. The method 200 includes providing an initial fiber board substrate in act or operation 102, forming a first oxide layer 23 in act or operation 104, and forming a second layer 35 impregnated with a catalyst 37 in act or operation 206. Act or operation 102, and act or operation 104, are both accomplished in the same manner in method 200 as in method 100.

Act or operation 206 in method 200 essentially combines act or operation 106 with act or operation 108 from method 100 so that forming second layer 35 and forming the catalyst 37 occur at the same time. In act or operation 206 a solution containing both a precursor to second layer 35 and a precursor to catalyst 37 is atomized and sprayed onto a fiber board previously processed according to act or operation 104. The thus coated fiber board is subjected to a thermal treatment to decompose the precursor materials into a mixture of the desired second layer 35 oxide and the desired catalyst 37. The choices of precursor materials, solvents, mixing ratios, and thermal treatment conditions for act or operation 206 are much the same as for act or operation 106.

The alternative embodiment described in method 200 produces a porous second layer 35 impregnated with catalyst 37, where some of the catalyst 37 is exposed within the pores and on the surface of second layer 35. Since some of the catalyst 37 is not exposed at a surface, but is instead completely encapsulated within second layer 35, the catalytic functionality of the fiber board 10 made according to method 200 will be less than the catalytic functionality of the fiber board 10 made according to method 100, for the same amount of applied catalyst precursor. Therefore, to achieve the same catalytic functionality with the fiber board 10 made according to method 200 it may be desirable to use a higher concentration of catalyst precursor in the solution in act or operation 206 than would be used in act or operation 108 of method 100.

The present invention will be further illustrated by the following examples. These non-limiting examples illustrate some embodiments and are intended to teach those skilled in the art how to put the present invention into practice.

EXAMPLE 1

A Bekitherm® board having side dimensions of 100 mm×200 mm and a thickness of about 5 mm, made of Fecralloy® alloy fibers, is treated in a muffle furnace for half an hour at 1100° C. under a static air atmosphere. Separately, a saturated solution of nonahydrate aluminum nitrate, $Al(NO_3)_2.9H_2O$, is prepared by adding the aluminum nitrate salt to a mixture composed of 100 ml of distilled water and 50 ml of isopropylic alcohol, $(CH_3)_2CH—OH$, until a deposit of the aluminum nitrate is left in the container. 10 ml of the clear solution above the deposit is transferred to the tank of a spraying device, of a known kind, having a spray nozzle connected to a feed dip hose disposed at the bottom of the tank. The fiber board is removed from the muffle furnace, cooled, and transferred to a heating plate adjusted to 80° C. Using successive iterations of about 30 seconds each separated by pauses of about 5 minutes each, the solution is atomized with the spray directed onto the fiber board. Deposition of the whole solution requires approximately 30 atomization iterations. The board is heated to 200° C. for 2 minutes, to favor complete solvent removal, and then to 500° C. for 1 hour in air to decompose the aluminum nitrate into alumina. A solution of 6 ml of palladium nitrate in distilled water is atomized and sprayed onto the fiber board after it has been cooled to 50° C. The solution is deposited in 10 successive atomization iterations, according to the procedure discussed for the aluminum nitrate solution atomization. The board is thermally treated in air, first at 500° C. for 1 hour and then at 750° C. for 1 hour.

EXAMPLE 2

The methane conversion efficiency of the functionalized fiber board prepared according to Example 1 is demonstrated. The test is performed by supplying a mixture with a known composition of methane and oxygen, at a fixed temperature, to the catalytic fiber board. The percentage of unburnt methane in the outlet gases are measured by an organic compound sensor T.O.C. ("Total Organic Carbon") manufactured by Nira Instruments, mod. 801-F.

Figure 6:
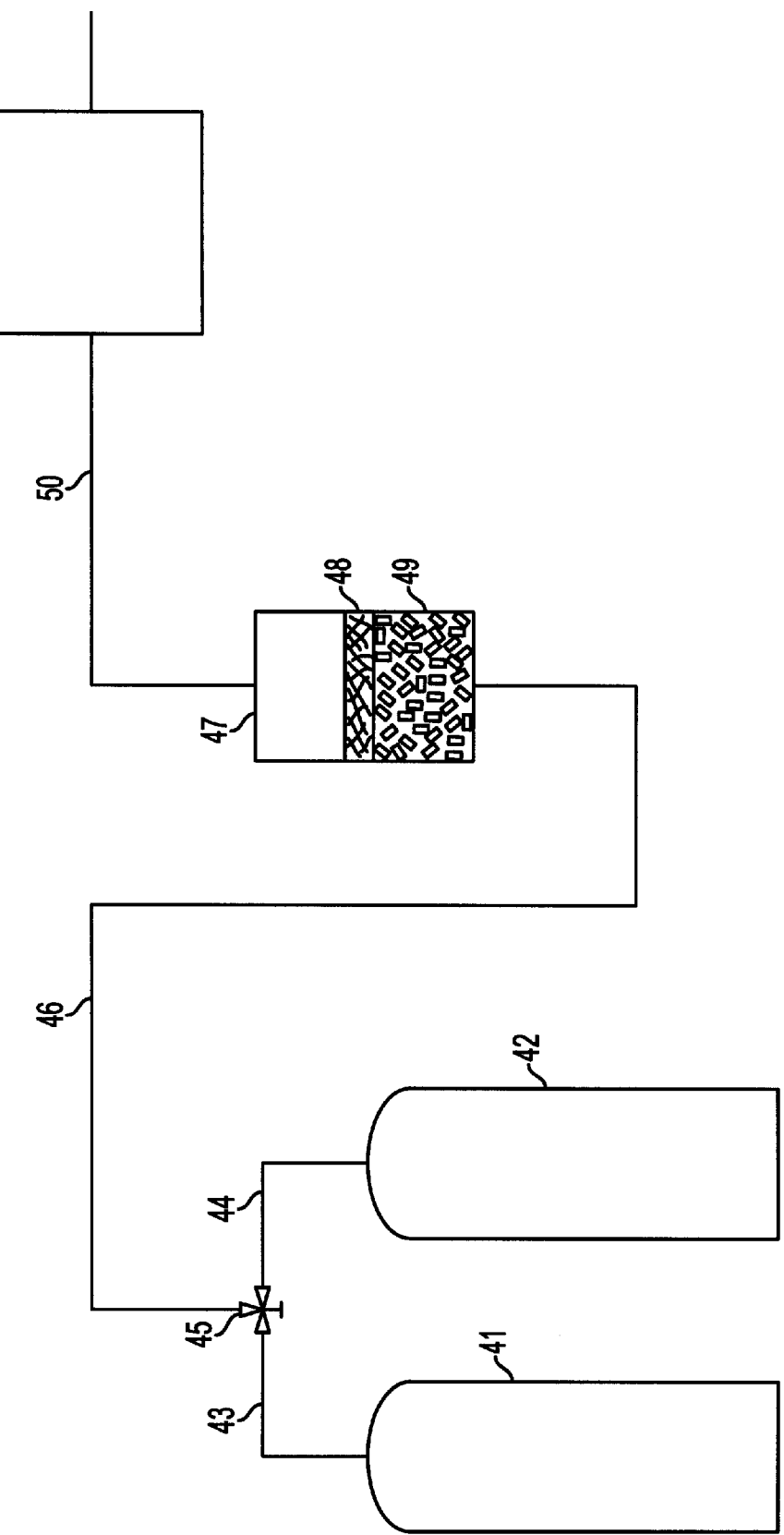
FIG. 6 schematically shows an experimental set-up for carrying out methane combustion tests.

The testing system is represented in the diagram of FIG. 6. A tank 41 for the gas to be analyzed, and a second tank 42 for air used as a reference gas are provided, respectively connected through lines 43 and 44 to a valve system 45. Valve system 45 alternatively supplies the reference gas and the mixture to be analyzed to measurement chamber 47 through line 46. The measurement chamber 47 consists of a 200 mm high metal cylinder having an internal diameter of 26 mm. A disk 48 with height of about 8 mm and diameter of 26 mm, equal to the internal diameter of measurement chamber 47, is cut from the functionalized fiber board of Example 1. Disk 48 is positioned at the half-height of the measurement chamber 47, in the location where the temperature is most uniform. Disk 48 is supported in place by tiny quartz cylinders 49, having diameters of 4 mm and heights of 4 mm and serving the additional purpose of homogeneously spreading the inlet gas flow onto disk 48. The measurement chamber 47 is positioned vertically, with the gas flow directed upwards. The outlet gas from measurement chamber 47 is supplied through line 50 to T.O.C. sensor 51.

Prior to the test, the fiber board sample is treated in the measurement chamber 47 at 400° C. for 1 hour under flowing air at a constant flow rate of 15 Nliters/min in order to remove possible impurities. The fiber board sample is then cooled under the same constant air flow to the initial test temperature of 300° C. 5 minutes after the temperature stabilizes at 300° C. a first analysis by the T.O.C. sensor 51 is performed, directing a sample of 0.2 ml of air from the measurement chamber 47 outlet to the sensor 51. Such a measurement provides a reference value at 300° C. Subsequently, a test mixture having composition by volume of methane 1%, air 30% and nitrogen 69% is supplied, at the same flow rate of 15 Nliters/min, to the measurement chamber 47, also maintained at 300° C. The gas outlet from chamber 47 is supplied to sensor 51, measuring the residual methane quantity. The conversion percentage of methane on the fiber board sample at 300° C. is determined by comparing the residual methane value to the concentration of methane entering the measuring chamber. The test is repeated at temperatures above 300° C., at intervals of 50° C., finishing at 600° C., alternating between the reference air and the methane/air/nitrogen mixture.

Figure 7:
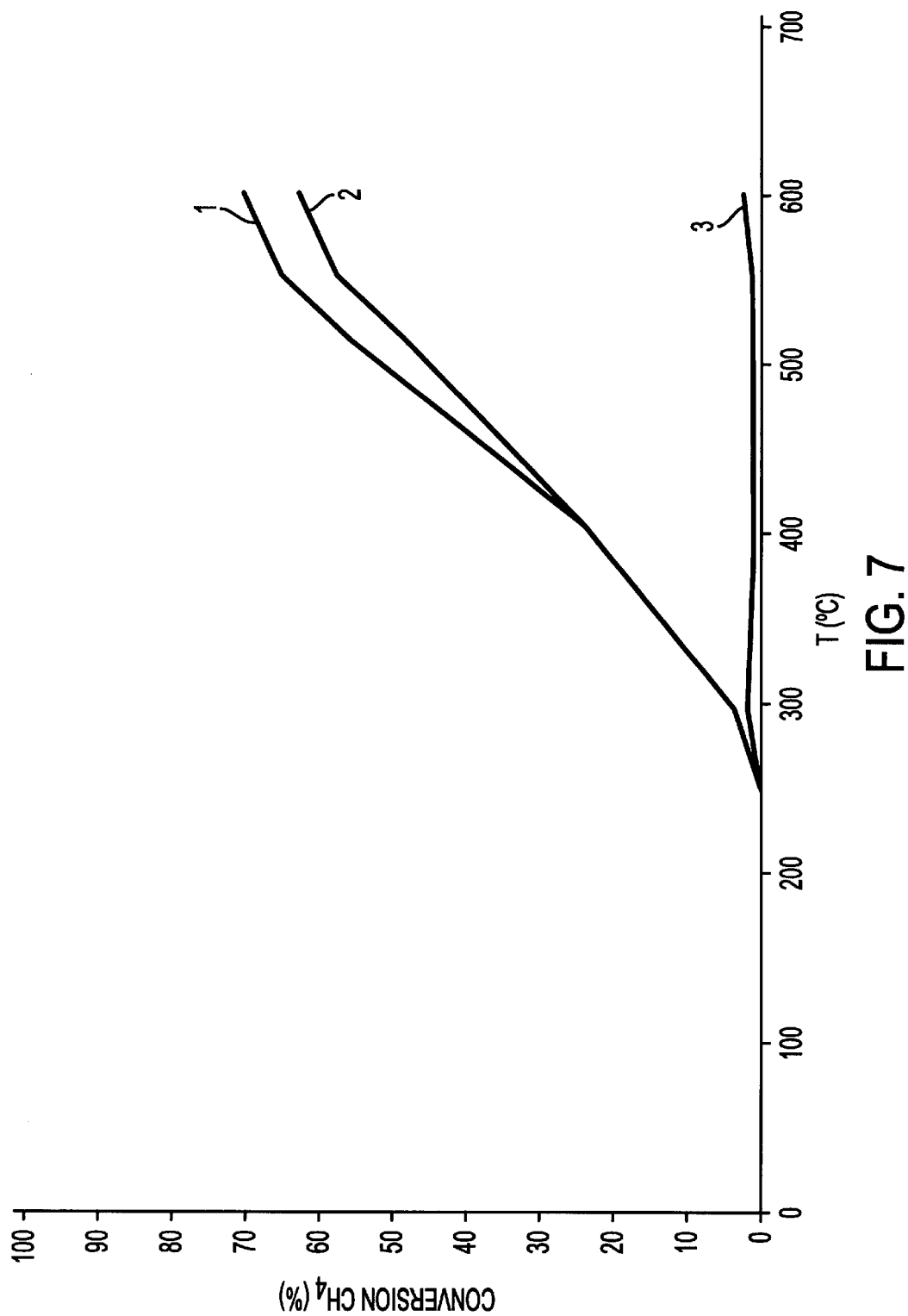
FIG. 7 compares the results of three methane combustion tests, two carried out with a fiber board according to the present invention and one with a reference board according to the prior art.

The test results, expressed as methane conversion percentage (%) as a function of the temperature in ° C., are shown in FIG. 7 as curve 1.

EXAMPLE 3

The testing described Example 2 is repeated. The test results are shown in FIG. 7 as curve 2.

EXAMPLE 4 (COMPARATIVE)

The test in Example 2 is repeated using a fiber board prepared by the procedure of Example 1, differing only in that no catalyst is applied. This test result is shown in FIG. 7, as curve 3.

As can be appreciated by the results shown in FIG. 7, the functionalized fiber boards prepared according to the present invention effectively reduce the methane combustion temperature. In other words, in the presence of a fiber board of the present invention, methane combustion occurs at temperatures as low as 300° C., with conversion percentage values in the range of 60 to 70% achieved at 600° C. By contrast, the non-functionalized fiber board showed no noticeable methane conversion at any temperature up to 600° C.

While this invention has been described in terms of several preferred embodiments, it is contemplated that alternatives, modifications, permutations and equivalents thereof will become apparent to those skilled in the art upon reading this specification. It is therefore intended that the following claims include all such alternatives, modifications, permutations and equivalents as fall within the true spirit and scope of the present invention.

What is claimed is:

1. A process for the production of a metallic fiber board having catalytic functionality, comprising:

providing a metallic fiber board formed of a plurality of metallic fibers;

forming a first layer of an oxide on said fibers of said fiber board by thermal oxidation;

forming a second layer of a porous oxide over said first layer by preparing a solution of a suitable precursor compound in a suitable solvent, atomizing said solution, spraying said solution onto said fiber board and decomposing said precursor compound by thermally treating said fiber board; and functionalizing said second oxide layer with a catalyst.

2. The process according to claim 1, wherein forming said catalyst comprises:

preparing a solution of a suitable catalyst precursor in a suitable solvent;

depositing said catalyst precursor onto said fibers of said fiber board; and decomposing said catalyst precursor by thermally treating said fiber board, thereby forming said catalyst disposed over said second layer.

3. The process according to claim 2, wherein depositing said catalyst precursor comprises:

atomizing said solution and directing a spray therefrom onto said fiber board.

4. The process according to claim 2, wherein depositing said catalyst precursor comprises:

dipping said fiber board into said solution; and withdrawing said fiber board from said solution.

5. The process according to claim 1, wherein said metallic fibers comprise an alloy containing iron, chromium and aluminum.

6. The process according to claim 1, wherein forming said first layer on said fibers of said fiber board by thermal oxidation is carried out by heating said fiber board in an atmosphere selected from the group of air, oxygen, mixtures of air and oxygen, mixtures of oxygen and nitrogen, water vapor, and combinations thereof.

7. The process according to claim 6, wherein said heating is carried out at a temperature in the range from about 550° C. to about 1200° C., for a period between about 10 minutes to about 10 hours.

8. The process according to claim 6, wherein said heating is carried out at a temperature in the range from about 1000° C. to about 1100° C., for a period in the range from about half an hour to about 2 hours.

9. The process according to claim 1, wherein said second layer is comprised of alumina, silica or combinations thereof.

10. The process according to claim 1, wherein said precursor compound is selected from the group comprising nitrates, acetates, and organometallic compounds of aluminum and silicon.

11. The process according to claim 1, wherein said precursor compound is an alkoxide compound having a general formula $M(OX)_n$, wherein M is aluminum or silicon, X is a hydrocarbon radical and n is the valence of the M cation.

12. The process according to claim 1, wherein said solvent is selected from the group comprising water, alcohols, and hydroalcoholic mixtures.

13. The process according to claim 1, wherein depositing said precursor compound onto said fibers of said fiber board is performed while said fiber board is kept at a temperature in the range of about 50° C. to about 150° C.

14. The process according to claim 1, wherein depositing said precursor compound onto said fibers of said fiber board is performed while said fiber board is kept at a temperature in the range of about 80° C. to about 120° C.

15. The process according to claim 1, wherein atomizing said solution and directing said spray therefrom onto said fiber board is accomplished by a plurality of atomization iterations separated by pauses.

16. The process according to claim 15, wherein a duration of said atomization iteration is about 2 minutes, a duration of a pause is about 5 minutes to about 10 minutes, and a solution flow rate during said atomization iteration is about 1 ml per 100 $cm^2$ of fiber board surface.

17. The process according to claim 1, wherein thermally treating said fiber board is performed in air at a temperature of about 500° C. for a period between about 1 and about 3 hours.

18. The process according to claim 1, wherein said catalyst is a noble metal selected from the group of elements comprising the eighth group of the periodic table.

19. The process according to claim 1, wherein said catalyst is palladium or rhodium.

20. The process according to claim 2, wherein said catalyst precursor is selected from the group comprising nitrates and amino-complexes of palladium and rhodium.

21. The process according to claim 4, wherein thermally treating said fiber board is performed at a temperature of about 500° C. for a period of about 30 minutes to about 120 minutes.

22. The process according to claim 21, wherein thermally treating said fiber board is performed in a reducing environment.

23. The process according to claim 21, wherein thermally treating said fiber board is performed in air.

24. The process according to claim 3, wherein said fiber board is maintained at a temperature of about 50° C.

25. The process according to claim 24, wherein thermally treating said fiber board is performed in air at a temperature of about 500° C. for a period of about 1 hour to about 3 hours.

26. The process according to claim 1, wherein forming said second layer and forming said catalyst comprises:

preparing a solution of a suitable catalyst precursor and a suitable precursor compound in a suitable solvent;

atomizing said solution and directing a spray therefrom onto said fiber board; and decomposing said catalyst precursor and said precursor compound by thermally treating said fiber board, thereby forming said second layer disposed over said first layer, said second layer being impregnated with said catalyst.

27. The process according to claim 26, wherein said precursor compound is selected from the group comprising nitrates, acetates, and organometallic compounds of aluminum and silicon, said catalyst precursor is selected from the group comprising nitrates and amino-complexes of palladium and rhodium, and said solvent is selected from the group comprising water, alcohols, and hydroalcoholic mixtures.

28. The process according to claim 27, wherein said precursor compound is an alkoxide compound having a general formula $M(OX)_n$, wherein M is aluminum or silicon, X is a hydrocarbon radical and n is the valence of the M cation.

29. The process according to claim 26, wherein atomizing said solution and directing said spray therefrom onto said fiber board is accomplished by a plurality of atomization iterations separated by pauses.

30. The process according to claim 29, wherein a duration of said atomization iteration is about 2 minutes, a duration of a pause is about 5 minutes to about 10 minutes, and a solution flow rate during said atomization iteration is about 1 ml per 100 $cm^2$ of fiber board surface.

31. The process according to claim 26, wherein thermally treating said fiber board is performed at a temperature of about 500° C. for a period between about 1 and about 3 hours.

32. The process according to claim 31, wherein thermally treating said fiber board is performed in a reducing environment.

33. The process according to claim 31, wherein thermally treating said fiber board is performed in air.

* * * * *